(12) United States Patent
Palsson et al.

(10) Patent No.: US 9,732,889 B2
(45) Date of Patent: Aug. 15, 2017

(54) FLANGE, AND A METHOD OF MANUFACTURING A FLANGE

(71) Applicant: Flowtite Technology AS, Sandefjord (NO)

(72) Inventors: Gudmundur Palsson, Sandefjord (NO); Tomas Andersson, Tonsberg (NO)

(73) Assignee: Flowtite Technology AS, Sandefjord (NO)

( * ) Notice: Subject to any disclaimer, the term of this patent is extended or adjusted under 35 U.S.C. 154(b) by 0 days.

(21) Appl. No.: 15/298,559

(22) Filed: Oct. 20, 2016

(65) Prior Publication Data

US 2017/0037988 A1 Feb. 9, 2017

Related U.S. Application Data

(62) Division of application No. 14/085,874, filed on Nov. 21, 2013, now Pat. No. 9,556,984.

(Continued)

(51) Int. Cl.
*F16L 47/14* (2006.01)
*F16L 23/024* (2006.01)
(Continued)

(52) U.S. Cl.
CPC .......... *F16L 23/024* (2013.01); *B29C 53/562* (2013.01); *B29C 69/002* (2013.01); *B32B 1/08* (2013.01); *B32B 5/12* (2013.01); *B32B 5/26* (2013.01); *B32B 7/02* (2013.01); *F16L 9/16* (2013.01); *F16L 47/14* (2013.01); *B29C 2793/009* (2013.01); *B29K 2101/10* (2013.01); *B29K 2105/089* (2013.01); *B29K 2105/0881* (2013.01); *B29L 2031/003* (2013.01);
(Continued)

(58) Field of Classification Search
CPC . B29C 66/7212; B29C 66/71; B29K 2309/08; B29K 2105/06; F16L 47/14; F16L 9/16; F16L 33/28
See application file for complete search history.

(56) References Cited

U.S. PATENT DOCUMENTS 2,703,109 A * 3/1955 Saville .................... F16L 11/02
138/109
3,495,627 A 2/1970 Pierpont
(Continued)

FOREIGN PATENT DOCUMENTS

GB 2033992 A 5/1980

*Primary Examiner* — Rodney Mintz
*Assistant Examiner* — Daniel Kenny
(74) *Attorney, Agent, or Firm* — Harness, Dickey & Pierce, P.L.C.

(57) ABSTRACT

A method of manufacturing at least one flange by first rotating a tubular element and two sheet elements with respect to one another until a radially enlarged portion and adjacent hub section have been formed on the tubular element. The sheet element is impregnated by a thermosetting resin. When the resin has cured, the radially enlarged portion is cut along a cut line, thereby also dividing the tubular element in two parts and generating at least a first flange having a first flange section and a first hub section. Optionally, a second flange having a second flange section and a second hub section, is generated. In a preferred embodiment, the cut line is arranged in the middle of the radially enlarged portion, whereby two similar flanges are generated.

8 Claims, 4 Drawing Sheets

Related U.S. Application Data

(60) Provisional application No. 61/728,903, filed on Nov. 21, 2012.

(51) Int. Cl.

| | |
|---|---|
| *B32B 1/08* | (2006.01) |
| *F16L 9/16* | (2006.01) |
| *B32B 5/26* | (2006.01) |
| *B29C 53/56* | (2006.01) |
| *B29C 69/00* | (2006.01) |
| *B32B 5/12* | (2006.01) |
| *B32B 7/02* | (2006.01) |
| *B29K 101/10* | (2006.01) |
| *B29K 105/08* | (2006.01) |
| *B29L 31/00* | (2006.01) |

(52) U.S. Cl.
CPC ... *B32B 2260/023* (2013.01); *B32B 2260/046* (2013.01); *B32B 2262/0269* (2013.01); *B32B 2262/101* (2013.01); *B32B 2262/106* (2013.01); *B32B 2597/00* (2013.01)

(56) References Cited

U.S. PATENT DOCUMENTS

| | | | |
|---|---|---|---|
| 3,537,484 A | | 11/1970 | McLarty |
| 3,610,288 A | | 10/1971 | Carr |
| 3,796,449 A | | 3/1974 | McLaughlin et al. |
| 4,065,339 A | * | 12/1977 | Lippert ............... B29C 57/00 156/149 |
| 4,619,470 A | | 10/1986 | Overath et al. |
| 4,813,457 A | | 3/1989 | Offringa et al. |
| 5,173,339 A | * | 12/1992 | Singer ............... B23P 15/002 29/890.129 |
| 5,352,309 A | | 10/1994 | Oswald |
| 5,732,743 A | | 3/1998 | Livesay |
| 2010/0227117 A1 | | 9/2010 | Dan-Jumbo et al. |

\* cited by examiner

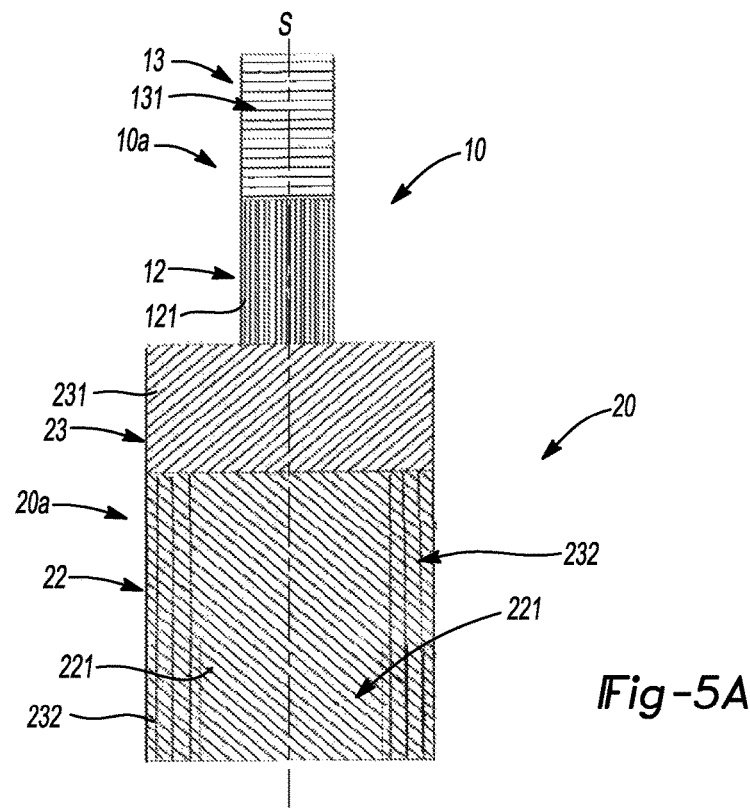
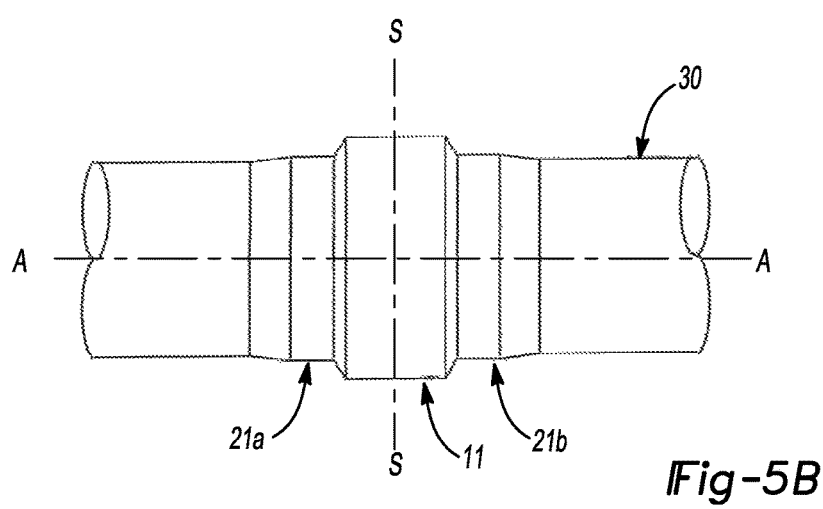

FLANGE, AND A METHOD OF MANUFACTURING A FLANGE

FIELD OF THE INVENTION

The invention concerns pipe flanges and the manufacture of such flanges. More specifically, the invention concerns fibre-reinforced flanges and a method of making such flanges.

BACKGROUND OF THE INVENTION

Pipes, pipe members, pipe spools, and other cylindrical objects such as tanks (hereinafter collectively referred to as pipe members) are traditionally joined by flanges. When two pipe members are joined by means of respective flanges, the flanges are in fact restrained joints that transfer axial loads between the pipe members. These axial loads are transferred between the pipe members via the flange hub, the flange, and the flange bolts. Because of the eccentricity of the flange bolts with respect to the pipe members' wall, this transfer of axial loads results in significant twisting loads on the flange and hub.

Various methods of connecting fibre-reinforced plastic pipes exist. The state of the art includes U.S. Pat. No. 4,619,470, which discloses how a pair of fibre-reinforced plastic pipe members are joined together in a flanged connection. The pipe members are formed to include an inner pipe jacket consisting essentially of a thermoplastic material and an outer pipe jacket consisting essentially of a fibre winding impregnated with a synthetic resin. A threaded section is formed in each of the outer pipe jackets at the end of each of the pipe members, a flange bushing is provided with a loose flange ring threadedly engaged on each of the threaded sections, and a covering collar covering at least the end of each of the pipe members is inserted at the inner pipe jacket.

The state of art the also includes U.S. Pat. No. 3,796,449, which describes a molded plastic flange encircling the exterior end portion of a fibre-reinforced plastic (FRP) pipe body. The flange has an elongated hub and a central bore extends through the flange and hub. The pipe body makes a tight fit in the bore, and a layer of adhesive (preferably epoxy resin with a filler of e.g. sand), bonds the inner diameter of the flange to the exterior of the pipe body. In one embodiment, the flange inner diameter is threaded onto the pipe body. A series of circumferentially spaced apart bolt holes are formed in flange, the bolt holes providing means for securing the flange to the flange of an adjoining pipe. A reinforcing ring, embedded in the hub, encircles pipe body. The flange is described as being made of fibre-reinforced plastic and the reinforcing ring is preferably made of a material having a higher Young's modulus than that of the plastic pipe body or the plastic flange. The reinforcing ring preferably is an integral steel O-ring, or can be made of multiple steel wires.

The state of the art also includes U.S. Pat. No. 4,813,457, disclosing a flange made of fibre-reinforced thermosetting synthetic resin. The flange comprises at least one flange section extending in an axial direction, which is fitted, or can be fitted, on a tubular part to be provided with a flange. The flange section joins the inside face of the flange which, together with an outside face of the flange, defines the flange. The flange has several fibre-reinforcement layers laid around each other and extending in an axial direction, and which are spirally wound up. The flange section extending in the axial direction also consists of fibre-reinforcement layers and thermosetting synthetic resin. In the region of the angular intersection between the inside face of the flange and the flange section extending in the axial direction, a reinforcement layer is arranged in order to prevent crack formation. The reinforcement layer extends from the inside face of the flange to the flange section extending in the axial direction. The reinforcement layer may be formed by a disc-shaped fibre-reinforcement layer having a central opening, or may consist of a layer of spun roving. The flange section is formed by spirally winding a glass fabric strip soaked in thermosetting synthetic resin. The glass fabric strip has a greater width than the width of the flange winding mould, as a result of which the strip is either provided with corrugations or bent over at its ends which lie up against the inside and outside faces of the flange.

While many of the known flange designs and methods of manufacture work well for smaller diameter flanges, they often tend to be costly for larger diameters. Practical constraints in reinforcement placement and orientation also often limit structural efficiency, especially for the larger flanges.

The applicant has devised and embodied the invention to overcome certain shortcomings of the prior art and to obtain further advantages.

SUMMARY OF THE INVENTION

The invention is set forth and characterized in the main claims, while the dependent claims describe other characteristics of the invention.

It is thus provided a flange, comprising a tubular member, a flange section, and a hub section, characterized in that the flange section comprises a first sheet element which has been wound a plurality of turns around the tubular member, and at least a first portion of a second sheet element which has been wound a plurality of turns around the tubular member; the hub section comprises at least a second portion of the second sheet element which has been wound a plurality of turns around the tubular member; said sheet elements being impregnated by a thermosetting resin.

In one embodiment, the first sheet element and the second sheet element are wound alternatingly around the tubular member. The first sheet element and the second sheet element are in one embodiment wound an equal number of turns around the tubular member. The first and second sheet elements are preferably first and second fibre reinforcing tapes, respectively, and the tubular member is preferably a fibre-reinforced plastic (FRP) pipe.

In one embodiment, the first reinforcement tape comprises a first ply and a second ply, and these plies each have rovings that have different respective orientations. In one embodiment, the first ply has tape-longitudinal rovings and the second ply has tape-transverse rovings. The number and/or strength of tape-longitudinal rovings is preferably greater than the number and/or strength of tape-transverse rovings. In one embodiment, the first tape comprises an assembly having no rovings other than a plurality of rovings extending in the tape-longitudinal direction.

In one embodiment, the second reinforcement tape comprises a first ply and a second ply, and these plies each have roving s that have different respective orientations.

The second reinforcement tape advantageously comprises threads arranged in a tape-longitudinal direction along both edges of the tape so as to provide tape-longitudinal strength. The first sheet element has a width that defines the axial dimension of the flange section, and the second sheet element has a width that defines the axial dimension of the flange section and hub section combined.

There is also provided a method of manufacturing at least one flange, characterized by the steps of:

a) rotating a tubular element and two sheet elements with respect to one another until a radially enlarged portion and adjacent hub sections have been formed on the tubular element; the sheet element comprising a fibre material impregnated by a thermosetting resin;

b) cutting the radially enlarged portion along a cut line, thereby also dividing the tubular element in two parts and generating at least a first flange having a first flange section and a first hub section.

In one embodiment, step b) additionally comprises simultaneously generating a second flange having a second flange section and a second hub section. The thermosetting resin is allowed to cure prior to executing step b).

In one embodiment, the sheet elements are applied onto the tubular element in alternating layers. In one embodiment, step a) comprises rotation of the tubular element. The first sheet element advantageously has a width that defines the axial dimension of the radially enlarged portion, and the second sheet element has a width that defines the axial dimension of the radially enlarged portion and the hub sections combined.

The tubular element is rotated about its longitudinal axis and the cut line is preferably arranged perpendicularly on the longitudinal axis. In a preferred embodiment, the cut line is arranged in the middle of the radially enlarged portion, whereby step b) generates two similar flanges.

The invented flange is made from laminated reinforcement tapes, wound on a pre-fabricated tubular element until the desired flange dimensions have been achieved. The tapes are impregnated by one or more resins. When the resins have cured, the flange blank is split along a line of symmetry, producing two virtually identical flanges.

The invented method ensures fast, cost-efficient and reliable manufacturing of fibre-reinforced flanges, preferably two flanges at a time, with optimized fibre placement and orientation.

BRIEF DESCRIPTION OF THE DRAWINGS

These and other characteristics of the invention will become clear from the following description of a preferential form of embodiment, given as a non-restrictive example, with reference to the attached drawings, wherein:

FIG. 5a is a schematic and partly cut-away sketch of the tapes used to build the flange blank, and FIG. 5b is similar to FIG. 2, and FIGS. 5a and 5b are arranged so as to illustrate the structure of the flange blank.

DETAILED DESCRIPTION OF A PREFERENTIAL EMBODIMENT

The invention relates to pipes and flanges made of fibre-reinforced, thermosetting synthetic resin. Examples of relevant fibre materials suitable for producing such pipes and flanges are for example glass, carbon, aramid, basalt; or natural fibres such as jute. Relevant literature and prior art use a wide variety of terms, such as fiberglass reinforced plastic, glass reinforced plastic, carbon fibre reinforced plastic, etc. In the following description, the general term "fibre-reinforced plastic (FRP)" will be used.

Figure 1:
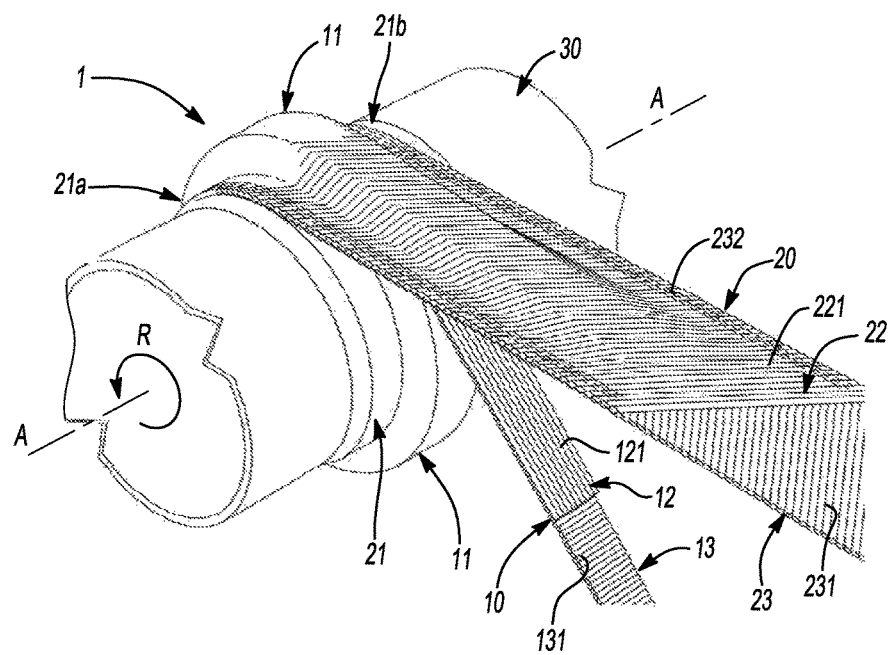
FIG. 1 is a perspective view illustrating an embodiment of the method of manufacturing a flange blank.

FIG. 1 illustrates a part of a method of manufacturing the flange according to the invention. A pipe section 30 is rotated about its longitudinal axis A-A in a direction indicated by the arrow R. The pipe section 30 is supported and rotated by equipment and means which are well known in the art, and therefore need not be illustrated here. The pipe section may for example be a part of an FRP pipe.

A first tape 10 and a second tape 20 are wound onto the pipe section, providing alternating layers of first and second tapes, and progressively building a laminated structure on the pipe section. The tapes 10, 20—which for example may be fibre reinforcement tapes—are impregnated by a resin (not shown), either before, during or after being wound onto the pipe section. This resin impregnation is well known in the art and therefore not described further. The tapes are wound from storage spools (not shown) on suitable application stations (not shown) adjacent to the pipe section.

Thus, by rotating the pipe section 30 a desired number of turns and using appropriately dimensioned tapes, the circumferential accumulation of the two tapes 10, 20 form a radially enlarged portion 11 and adjacent hub portions 21a,b on the pipe section 30. This is shown in FIG. 1, where the pipe section clearly has been rotated a number of turns in order to build the enlarged portion.

Figure 2:
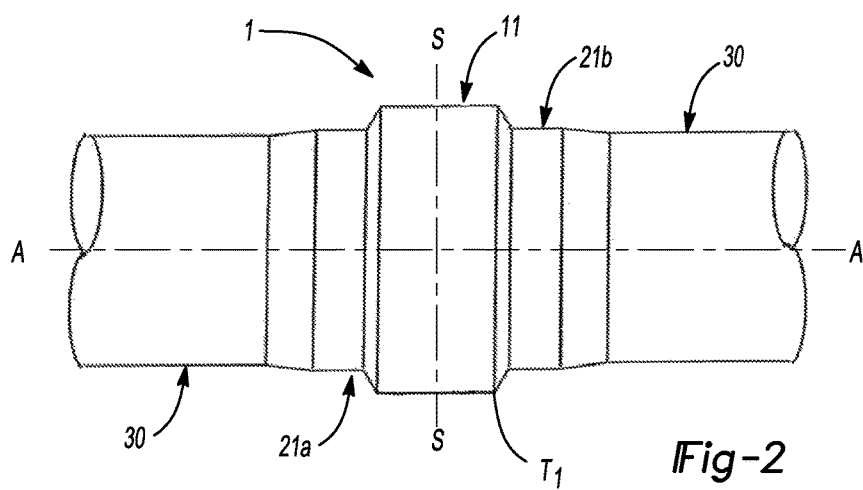
FIG. 2 is a side view of a flange blank manufactured by the method according to the invention and illustrated in FIG. 1.

FIG. 2 illustrates the manufactured product when the winding process has been completed. This product in effect constitutes a flange blank 1, from which two flanges may be made by cutting along the line S-S (after the resin has cured). The term "flange blank" shall in the context of this description mean an element that has been prepared to be made into one or two flanges by a further operation.

Figure 3:
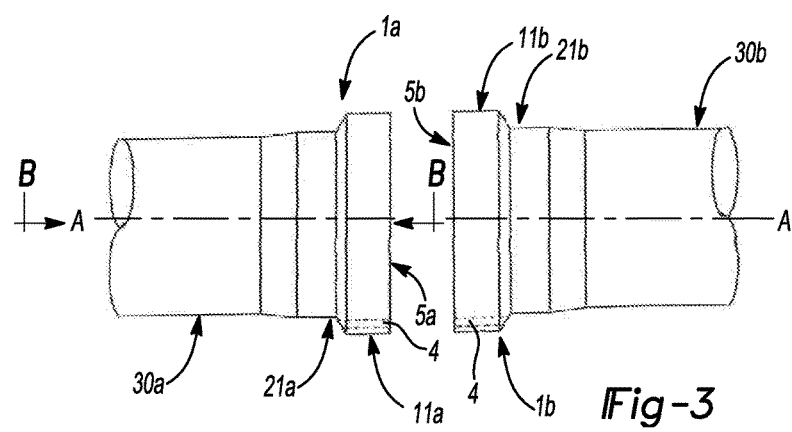
FIG. 3 is a side view of an embodiment of two flanges according to the invention, after the blank illustrated in FIG. 2 has been cut.

The cutting operation separates the flange blank 1 into two hubbed flanges 1a, 1b, shown in FIG. 3. In the illustrated embodiment, the line S-S is a line of symmetry, and the resulting hubbed flanges 1a, 1b are identical. It may, however, be desirable to produce two flanges with different flange thicknesses (e.g. for different pressure classes) from the same flange blank; in which case the line S-S may be moved in the pipe axial direction. It is also within the scope of this invention to make a single flange from the flange blank, e.g. by placing the line S-S at the edge of the radially enlarged portion 11, indicated by $T_1$ in FIG. 2, cut along that line and discard the right-hand portion.

Each hubbed flange 1a, 1b comprises a flange section 11a, 11b and a hub section 21a, 21b fitted to a pipe member 30a, 30b. The cutting may be performed by any known means, e.g. a saw suitable for cutting cured fibre-reinforced material. In FIG. 3, bolt holes 4 (indicated by dotted lines) extend through both flange sections. The bolt holes may be made in a number of ways, e.g. by drilling (after curing) or by embossing (prior to curing). The bolt holes may be made before or after the flange blank is cut and separated into two hubbed flanges.

The method described above may thus be used to make hubbed flanges with flange sections of any desired axial and radial dimension, with or without holes, such as conventional flanges, van Stone flanges, Puddle flanges, flanges having separate (loose) collars, etc.

While the method of manufacturing the flange blank has been described with reference to a rotating pipe section, it should be understood that the flange blank 1 may also be made by keeping the pipe section stationary, and rotating (winding) the tapes around the non-rotating pipe. A combination (rotating pipe section and counter-rotating tapes) is also envisaged.

It is therefore seen that the element illustrated in FIG. 2 is a blank for making the individual flange sections 11a, 11b shown in FIG. 3. In that cutting process, the first tape 10 and the second tape 20 of the radially enlarged portion 11 are thus split lengthwise (i.e. in the tape longitudinal direction), into respective parts. In the following, these parts will typically be referred to as "split tapes", implying that they are split lengthwise"

Figure 4:
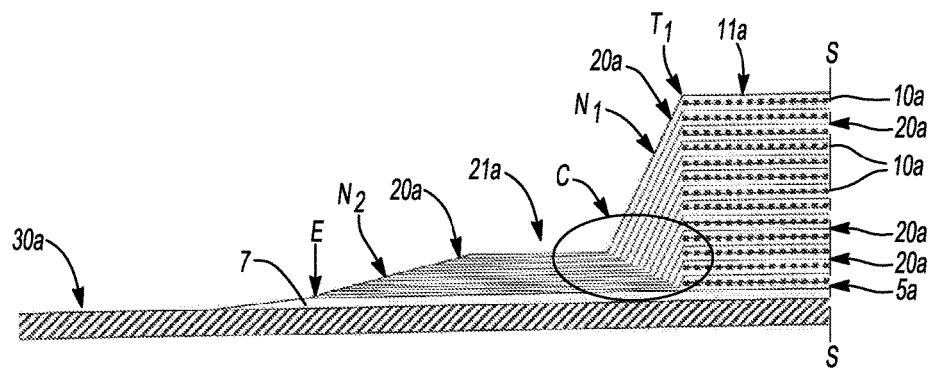
FIG. 4 is a sectional side view along section line B-B in FIG. 3, illustrating key elements of the invented flange.

Referring to FIG. 4, a flange section 11a is made up of a split first tape 10a and a split second tape 20a, both wound a number of times around the pipe member 30a. In the illustrated embodiment, the split first tape 10a has half the width of the first tape 10 and the split second tape 20a has half the width of the second tape 20. However, these need not necessarily be halves, if the cut line S-S is placed differently from that shown on FIG. 2 (as discussed above).

In the embodiment illustrated in FIG. 4, the split first tape 10a and the split second tape 20a have been laminated (i.e. wound alternatingly) around the pipe member 30a, as described above with reference to FIG. 1. The respective structures of the two tapes are discussed in more detail below, but FIG. 4 shows that while the split first tape 10a serves to build and define the pipe-axial dimension of the flange section 11a, the split second tape 20a serves to build both the flange section 11a and the hub section 21a and defines the pipe-axial dimension of the hub 21a. The split first tape 10a thus extends from the flange face 5a to a first transition point $T_1$, where the flange section starts to taper into the hub section. The split second tape 20a also extends from the flange face 5a, but continues past the first transition point $T_1$ and to a hub section end region E. It should be understood that the slope of the first tapered regions $N_1$ depends on the tape thicknesses, and the ratio between the thicknesses of the two tapes.

FIG. 4 also indicates an initial reinforcement layer 7 between the outer wall of the pipe member 30a and the split tapes. This reinforcement layer 7, which is optional, may for example be a chop-strand mat reinforced laminate.

The split tapes 10a, 20a are impregnated by a resin (not shown), as described above, in a manner which is well known in the art.

The composition of the tapes used to build the flange will now be discussed in more detail. Reference is made to FIGS. 1, 5a, and 5b.

The first tape 10 (which forms the basis for the split first tape 10a as described above) comprises in the illustrated embodiment of a first ply 12 having longitudinal rovings 121 and a second ply 13 having transverse rovings 131. The first and second plies may be stitched together by a thread (not shown) in a manner which is known in the art, or the plies may in fact be applied as separate tapes, being joined as they are wound around the pipe section 30. Important and desired flange properties that are provided by the first tape 10 are a high flange hoop E-modulus and resistance to torsion. One way of achieving these properties is—as indicated by the line density in FIG. 5a—to design the first tape 10 with a higher number of rovings oriented in the tape longitudinal direction than in its transverse direction. Another, not illustrated, way of achieving such flange properties is to increase the weight of each of the longitudinal rovings 121. A combination of these two ways is conceivable.

The following non-limiting example illustrates a design where the first ply has fewer but stronger rovings than the second ply, and the resulting ply weight in the longitudinal ply is greater than in the transverse ply:

First ply 12, having longitudinal (0°) rovings 121
  Gauge: 10 rovings/inch
  Fibre tex: 2400 (i.e. 2.4 g/m)
  Ply weight: 945 gm$^2$
Second ply 13, having transverse (90°) rovings 131
  Gauge: 17 rovings/inch
  Fibre tex: 300 (i.e. 0.3 g/m)
  Ply weight: 201 g/m$^2$ The transverse rovings 131 provide strength in the flange axial direction and provides for improved shear stress distribution. Other angular roving orientations may be used, as applicable.

The first tape 10 is generally narrow (compared to the second tape 20). In the illustrated embodiment where two similar flanges are being made, the first tape has a width that corresponds to twice the axial distance of the two manufactured flange sections. In general, the first tape 10 has a greater weight (g/m$^2$) than that of the second tape 20, whereby the radially enlarged portion 11 is built up to a greater extent than the hub portions 21a,b. The individual tape weights are chosen according to the desired flange specifications (e.g. flange section width, hub width and taper, flange section diameter).

The second tape 20 (which forms the basis for the split first tape 20a as described above) must be sufficiently wide to cover the axial length of the radially enlarged portion 11 (i.e. the two flange sections 11a,b) and the two hubs 21a,b. It is preferable comparably lighter than the first tape in order to provide the desired flange-to-hub radial thickness ratio.

The second tape 20 is built up of two plies 22, 23 having respective glass rovings 221, 231 oriented at angles with respect to one another. In the illustrated embodiment, the rovings are oriented at of ±45° with respect to one another, but the angular orientation may typically be in the range of ±30° to ±60° relative to the tape direction. The plies 22, 23 of the second tape 20 are stitched together by a thread (not shown) across the width of the tape. Stitching is preferably loose; allowing the second tape to build both hub and flange without creasing.

In FIG. 1, a portion of the first ply 12 of the first tape 10 has been removed to show the second ply 13 underneath, and a portion of the first ply 22 of the second tape 20 has been removed to show the second ply 23 underneath. The sketch in FIG. 5a is built up in a similar manner, in order to illustrate the orientations of the different rovings.

Both FIG. 1 and FIG. 5a illustrate a plurality of threads 232 in the second tape 20, running on both sides of the tape, in a tape-longitudinal direction. These threads 232, which may be manufactured of polyester, provide edge regions of increased longitudinal strength and stiffness, compared to the central region of the second tape. The threads 232 provide a comparably high tensile strength, which allows a use of high tension during the winding procedure. This is a desired property in order to ensure adequate compaction of the laminated flange blank during winding.

The first tape 10 is thus designed in order to build a flange with a high hoop E-modulus, while the threads 232 of the second tape 20 serve as an aid in the process of building the flange.

Figure 6:
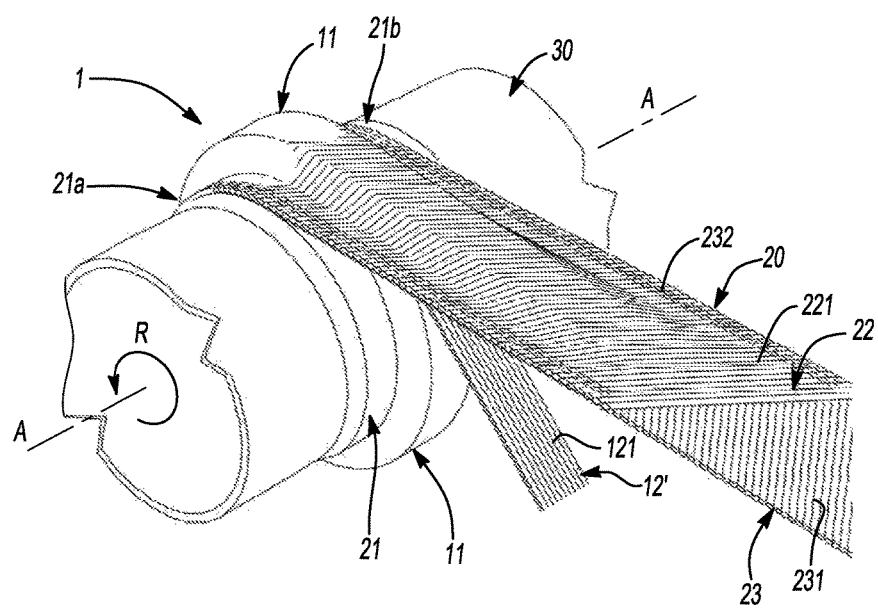
FIG. 6 is similar to FIG. 1, but illustrates an alternative embodiment of the first tape.

Referring now to FIG. 6, the first tape 10 as described above may in an alternative embodiment be substituted by a single layer 12' of a plurality of longitudinal rovings 121. The rovings 121 may be stitched together by a thread (not shown) in a manner which is known in the art, in order to stabilize the plurality of threads until they are wound onto the pipe section 30.

While the method of manufacturing described above refer to a laminating process, i.e. winding the first 10 and second 20 tapes alternatingly onto the pipe section 30, it should be understood that the tapes may also be wound onto the pipe section in other ways. For example, it may in certain cases be desirable to wind the first tape a number of turns more than the second tape, in order to build additional flange dimension.

While the method of manufacturing described above and the accompanying drawings show a symmetrical arrangement of the first and second tapes, it should be understood that the second tape 20 may be shifted sideways (i.e. in a pipe-axial direction) with respect to the first tape 10, if it is desired to produce the two hubs with different shapes.

The resins may be any known suitable resin, for example epoxy, vinyl ester, polyester, polyurethane, phenolic.

The invention claimed is:

1. A method of manufacturing at least one flange, comprising the steps of:
    a) rotating a tubular element and first and second sheet elements with respect to one another such that the first sheet element and the second sheet element are wound alternatingly around the tubular element until a radially enlarged portion and adjacent hub sections have been formed on the tubular element; the sheet element comprising a fibre material impregnated by a thermosetting resin; and
    b) cutting the radially enlarged portion along a cut line, thereby also dividing the tubular element in two parts and generating at least a first flange having a first flange section and a first hub section.

2. The method of claim 1, wherein step b) additionally comprises simultaneously generating a second flange having a second flange section and a second hub section.

3. The method of claim 1, wherein the thermosetting resin is allowed to cure prior to executing step b).

4. The method of claim 1, wherein the sheet elements are applied onto the tubular element in alternating layers.

5. The method of claim 1, wherein step a) comprises rotation of the tubular element.

6. The method of claim 1, wherein the first sheet element has a width that defines a longitudinal dimension of the radially enlarged portion, and the second sheet element has a width that defines a longitudinal dimension of the radially enlarged portion and the hub sections combined.

7. The method of claim 1, wherein the tubular element is rotated about its longitudinal axis and the cut line is arranged perpendicularly on the longitudinal axis.

8. The method of claim 7, wherein the cut line is arranged in the middle of the radially enlarged portion, whereby step b) generates two similar flanges.

* * * * *